(12) United States Patent
Sobrado et al.

(10) Patent No.: US 6,980,966 B1
(45) Date of Patent: Dec. 27, 2005

(54) GUIDED BUYING DECISION SUPPORT IN AN ELECTRONIC MARKETPLACE ENVIRONMENT

(75) Inventors: José A. Sobrado, Irving, TX (US); Shridhar Mittal, Plano, TX (US); Tares S. Burghli, Lombard, IL (US); Harsha Chaturvedi, Coppell, TX (US)

(73) Assignee: i2 Technologies US, Inc., Dallas, TX (US)

( * ) Notice: Subject to any disclaimer, the term of this patent is extended or adjusted under 35 U.S.C. 154(b) by 596 days.

(21) Appl. No.: 09/842,297

(22) Filed: Apr. 25, 2001

Related U.S. Application Data

(60) Provisional application No. 60/238,307, filed on Oct. 5, 2000.

(51) Int. Cl.[7] ............................................. G06F 17/60
(52) U.S. Cl. ....................................................... 705/26
(58) Field of Search .................................... 705/26, 27

(56) References Cited

U.S. PATENT DOCUMENTS

| | | | | |
|---|---|---|---|---|
| 4,992,940 A | * | 2/1991 | Dworkin ...................... | 705/26 |
| 5,041,972 A | | 8/1991 | Frost .......................... | 364/401 |
| 5,237,496 A | | 8/1993 | Kagami et al. ............. | 364/401 |
| 5,305,199 A | | 4/1994 | LoBiondo et al. .......... | 364/403 |
| 5,712,989 A | | 1/1998 | Johnson et al. ............. | 395/228 |
| 5,715,402 A | * | 2/1998 | Popolo ........................ | 705/37 |
| 5,715,444 A | * | 2/1998 | Danish et al. ................ | 707/4 |
| 5,734,890 A | | 3/1998 | Case et al. .................. | 395/605 |
| 5,765,143 A | | 6/1998 | Sheldon et al. ............... | 705/28 |
| 5,897,639 A | * | 4/1999 | Greef et al. ............ | 707/103 R |
| 5,960,414 A | | 9/1999 | Rand et al. ................... | 705/28 |
| 5,963,920 A | | 10/1999 | Rose et al. ................... | 705/28 |
| 6,009,407 A | | 12/1999 | Garg ........................... | 705/10 |
| 6,012,051 A | * | 1/2000 | Sammon et al. .............. | 706/52 |
| 6,032,145 A | * | 2/2000 | Beall et al. ...................... | 707/5 |
| 6,035,294 A | * | 3/2000 | Fish ............................... | 707/2 |
| 6,049,777 A | | 4/2000 | Sheena et al. ................ | 705/10 |
| 6,055,519 A | | 4/2000 | Kennedy et al. .............. | 705/80 |
| 6,064,980 A | | 5/2000 | Jacobi et al. ................. | 705/26 |
| 6,167,380 A | | 12/2000 | Kennedy et al. ............. | 705/10 |

(Continued)

FOREIGN PATENT DOCUMENTS

| EP | 0 463 616 A2 | 6/1991 | ........... G06F 15/21 |

(Continued)

OTHER PUBLICATIONS

"It pays to shop around", Inside the Internet, vol. 7, No. 8 (Aug. 2000), pp 1-5.*

(Continued)

*Primary Examiner*—Thomas B. Will
*Assistant Examiner*—Nathan Mammen
(74) *Attorney, Agent, or Firm*—James E. Walton; Brian E. Harris

(57) ABSTRACT

A system (10) for providing guided buying decision support within an electronic marketplace environment includes a server (42) that interacts with buyers (12) to receive procurement parameters for items. An option generator (50) receives procurement parameters for a particular item needed by a particular buyer (12), determines one or more acceptable item-supplier combinations consistent with the procurement parameters for the item, and generates one or more recommended options for communication to the buyer (12), each recommended option specifying a service through which it is possible to procure the item consistent with the procurement parameters. The server (42) further interacts with the buyer (12) to receive a selection of a particular recommended option. A manager application (46) automatically initiates the service specified in the selected recommended option in an attempt to procure the item consistent with the procurement parameters.

49 Claims, 7 Drawing Sheets

U.S. PATENT DOCUMENTS

| | | | |
|---|---|---|---|
| 6,195,652 B1 | 2/2001 | Fish | 707/2 |
| 6,249,774 B1 | 6/2001 | Roden et al. | 705/28 |
| 6,266,652 B1 | 7/2001 | Godin et al. | 705/37 |
| 6,321,133 B1 | 11/2001 | Smirnov et al. | 700/100 |
| 6,324,522 B2 | 11/2001 | Peterson et al. | 705/28 |
| 6,381,597 B1 * | 4/2002 | Lin | 707/4 |
| 6,415,270 B1 * | 7/2002 | Rackson et al. | 705/37 |
| 6,633,852 B1 * | 10/2003 | Heckerman et al. | 705/27 |
| 6,636,836 B1 * | 10/2003 | Pyo | 705/26 |
| 6,751,597 B1 * | 6/2004 | Brodsky et al. | 705/37 |
| 2002/0013721 A1 | 1/2002 | Dabbiere et al. | 705/7 |
| 2002/0019761 A1 | 2/2002 | Lidow | 706/10 |

FOREIGN PATENT DOCUMENTS

| | | | |
|---|---|---|---|
| WO | WO 00/34886 | * | 6/2000 |

OTHER PUBLICATIONS

"Survey: E-Commerce: In the great web bazaar", The Economist, vol. 354, iss. 8159 (Feb. 26, 2000).*

Kevin Pilot, "'Bot' Till You Drop", Registered Representative, Feb. 2000, p. 1.*

Jennifer Rowley, "Shopping bots: intelligent shopper or virtual department store?", International Journal of Retail & Distribution Management, vol. 28, No. 7 (2000), pp. 297-306.*

Elizabeth Crane. "Attention Shoppers!", PC World, Dec. 1999, p. 223-240.*

Paul Keegan, "Online auctions: From seedy flea markets to big business", Upside, Jul. 1999, pp. 70-81.* www.mysimon.com (as archived by www.archive.org on Aug. 15, 2000).* www.bottomdollar.com (as archived by www.archive.org on Aug. 16, 2000).*

PCT International Search Report, 4 pages, May 14, 2002.

Unknown, "Sellers Flock to OutletZoo.com as New Automatic Price Drop Method Moves Excess Inventory Online," Business Wire, DIALOG(R)File 610: Business Wire, 2 pages, Oct. 25, 1999.

Unknown, "OpenSite Technologies, Inc. Helps AOL Raise $100,000 With Online Charity Auction," Business Wire, DIALOG(R)File 621:Gale Group New Prod.Annou. (R), 1 page, Jan. 6, 1999.

Unknown, "News Briefs," Interactive PR & Marketing News, v4, n31, DIALOG(R)file 636:Gale Group Newsletter DB (TM), Sep. 19, 1997.

PCT Notification of Transmittal of the International Search Report or the Declaration, 3 pages, Jan. 17, 2002.

PCT Notification of Transmittal of the International Search Report or the Declaration, 6 pages, Jan. 23, 2002.

PCT, Notification of Transmittal of the International Search Report or the Declaration, 5 pages, Feb. 13, 2002.

PCT, Notification of Transmittal of the International Search Report or the Declaration, 3 pages, Feb. 13, 2002.

Funaki, et al., "Method and System for Production Planning Transaction," JP02001331693A, EAST Version 1.03.0002, 58 pages, Apr. 9, 2002.

PCT, Notification of Transmittal of the International Search Report or the Declaration, 3 pages, Aug. 29, 2002.

* cited by examiner a TradeMatrix Marketplace
Home | Design | Buy | Sell | Plan | Fulfill | Service | Content | Platform
Problem Detail | Search Alternates Welcome Visitor | Login | Register | Sitemap | Support | Contact Please specify procurement parameters:

Numeric Item Parameters

| | Current Value | Min | Max | UOM | | Current Value | Min | Max |
|---|---|---|---|---|---|---|---|---|
| Supply Voltage-Nom: | 5 | 5 | 5 | Volts | Number of Ports: | 1 | 1 | |
| Supply Voltage-Min: | 4.5 | 4.5 | 4.5 | Volts | Number of Functions: | 1 | 1 | |
| Supply Voltage-Max: | 5.5 | 5.5 | 5.5 | Volts | Number of Actual Terminals: | 28 | 28 | |
| Temperature-Min: | 0 | | 0 | Celsius | Memory width: | 8 | | |
| Temperature-Max: | 70 | 70 | | Celsius | Access Time-Max: | 60 | 60 | |
| Number of Words: | 2097152 | 524288 | | | | | | |

Alphanumeric Item Parameters

| | Current Value | Operator | Parameter | | Current Value | Operator | Parameter |
|---|---|---|---|---|---|---|---|
| Terminal Position: | DUAL | is | DUAL | Operating Mode: | ASYNCHRONOUS | is | ASYNCHRON |
| Terminal Form: | J BEND | is | J BEND | Number of Words Code: | 2M | | |
| Technology: | CMOS | is | CMOS | JESD-30 Code: | R-PDSO-G28 | is | R-PDSO-G |
| Surface Mount: | YES | is | YES | DRAM Type: | FAST PAGE DRAM | is | FAST PAGE |
| Package Style: | SMALL OUTLINE | is | | Additional Feature: | RAS ONLY; CAS BEFORE RAS; HIDDEN; SELF REFRESH | | |
| Package Shape: | RECTANGULAR | is | | Access Mode: | FAST PAGE | is | FAST PAGE |
| Package Body Material: | PLASTIC/EPOXY | is | | | | | |
| Organization: | 2M X 8 | is | | | | | |

FIG. 3A    TO FIG. 3B

FROM FIG. 3A

SOURCING PARAMETERS

| | | |
|---|---|---|
| WHO | Quantity Desired: | 15000 |
| | Maximum Buy Price (optional): | 40 |
| | Source Types: | ☐ Contract Manufacturing |
| | | ☑ Manufacturer |
| | | ☑ Distributor |
| | | ☑ Consumer |
| WHAT | Use Types: | ☐ Used Parts |
| | | ☑ New Parts |
| WHEN | Due Date (optional): | 10/29/2000  (mm-dd-yyyy) |
| WHERE | Delivery Location: | Dallas Location ▼ |
| HOW | Source Types: | ☑ Show Listing Source Types |
| | | ☑ Show Auction Source Types |
| | | ☑ Show Purchasing Pool Source Types |

[ Get Options ]

| Details | Source Rating | Source | Use Type | Source Type | Description | Mfr Name | Mfr Item Number | Supplier Name | Supplier Item Number | Availability | Price |
|---|---|---|---|---|---|---|---|---|---|---|---|
| ☐ | 9 | Auction | New | Consumer | 2M DRAM | ABC Engineering | 346464-444-11 | 123 Industrial | UHYGR654733 | 15-Oct | 36 |
| ☐ | 8 | Catalog | New | Distributor | 80 ns: FAST PAGE - DRAM | DEF Enterprises | 34536/RJT | 456 Inc. | FVTED654238 | 20-Oct | 42 |
| ☐ | 8 | Auction | New | Distributor | Fast Page DRAM | GHI Inc. | 33445-5566 | 789 Inc. | MHET56777 | 12-Oct | 29 |
| ○○○ | ○○○ | ○○○ | ○○○ | ○○○ | ○○○ | ○○○ | ○○○ | ○○○ | ○○○ | ○○○ | ○○○ |
| ☐ | 7 | Listing | New | Manufacturer | DRAM: RECTANGULAR, PLASTIC, INSERT | XYZ Inc. | THY6547 | UVW Ltd. | THY6547 | 18-Oct | 40 |

[ SELECT OPTION ]   [ MODIFY PARAMETERS ]

*FIG. 3C*

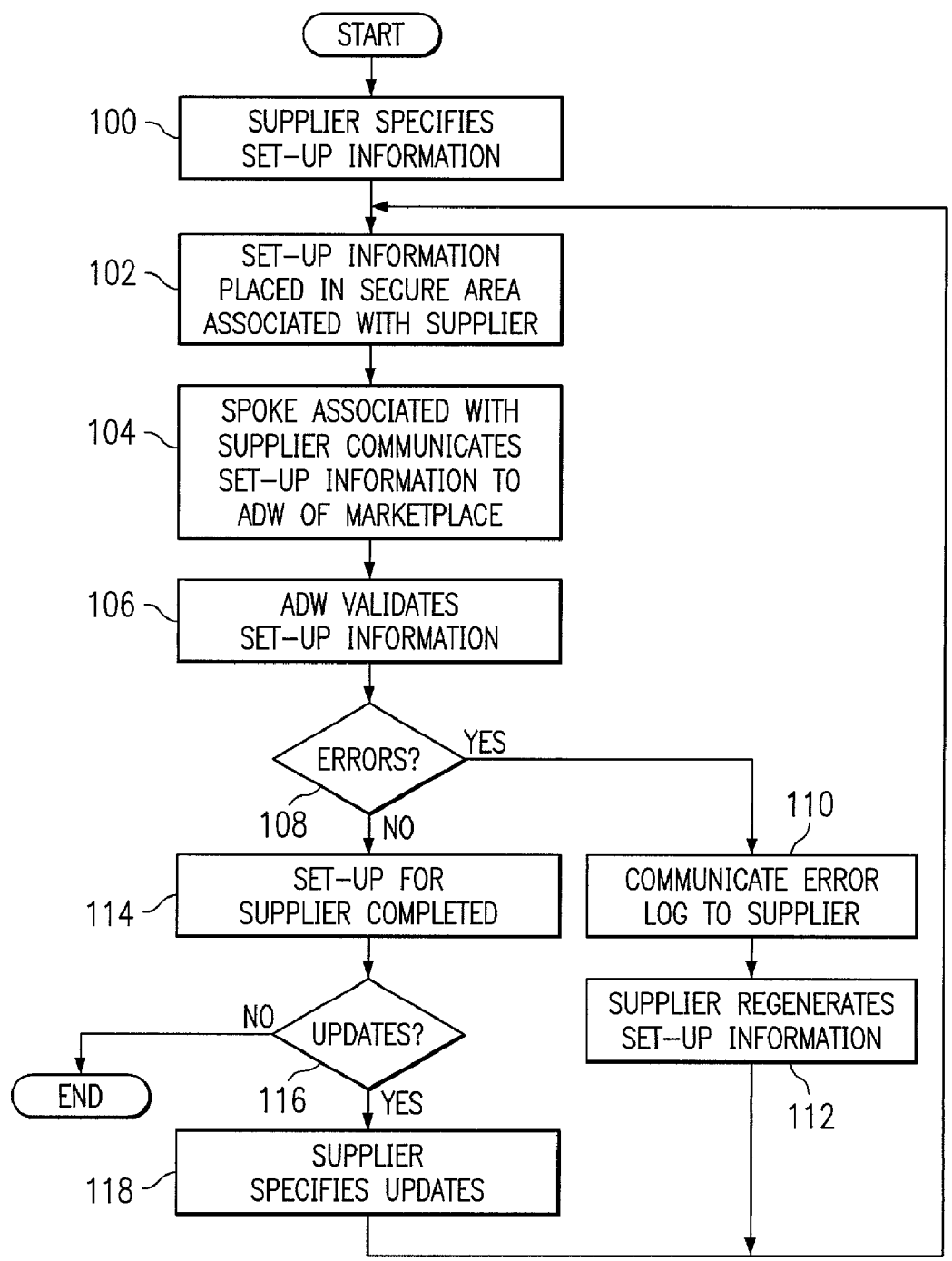

GUIDED BUYING DECISION SUPPORT IN AN ELECTRONIC MARKETPLACE ENVIRONMENT

RELATED APPLICATIONS

This application claims the benefit under 35 U.S.C. § 119(e) of U.S. Provisional Application Ser. No. 60/238,307, filed Oct. 5, 2000.

TECHNICAL FIELD OF THE INVENTION

This invention relates generally to commercial transactions, and more particularly to guided buying decision support in an electronic marketplace environment.

BACKGROUND OF THE INVENTION

Businesses and other organizations must regularly procure certain items to carry out their operations. For example, a user in a manufacturing enterprise might be tasked with procuring from one or more suppliers a quantity of component parts that will be used to manufacture end products ("direct procurement"). As another example, a user in the same or a different enterprise might be tasked with procuring from one or more suppliers a quantity of products used in conducting daily operations of the enterprise ("indirect procurement"). As yet another example, an individual may wish to procure a single product from a retailer. Despite the procurement needs of enterprises and the sophistication of many procurement processes, previous procurement techniques have serious deficiencies. For example, even if a user knows what item must be procured, there may be much difficulty in determining the identities of suppliers of that item and, more importantly, the suppliers that can supply the item with particular attributes, at a particular price, for delivery before a particular date. Furthermore, even if the user is capable of determining an acceptable item-supplier combination, typically after a great deal of effort, the user is unable to determine whether a better overall deal could have been made through another supplier. As a result of any of these or other deficiencies, previous procurement techniques have been inadequate for many needs.

SUMMARY OF THE INVENTION

According to the present invention, problems and disadvantages associated with prior procurement techniques have been substantially reduced or eliminated.

According to one embodiment of the present invention, a system for providing guided buying decision support within an electronic marketplace environment includes a server that interacts with buyers to receive procurement parameters for items. An option generator receives procurement parameters for a particular item needed by a particular buyer, determines one or more acceptable item-supplier combinations consistent with the procurement parameters for the item, and generates one or more recommended options for communication to the buyer, each recommended option specifying a service through which it is possible to procure the item consistent with the procurement parameters. The server further interacts with the buyer to receive a selection of a particular recommended option. A manager application automatically initiates the service specified in the selected recommended option in an attempt to procure the item consistent with the procurement parameters.

Certain embodiments of the present invention may provide one or more technical advantages over previous procurement techniques. The present invention may provide one or more buyers within an electronic marketplace environment with decision support to enhance their procurement experience. The present invention may enable buyers to achieve optimal or near optimal procurement results with relatively little (or possibly even no) user interaction. This not only reduces errors and their associated transaction costs, but may significantly increase the speed, efficiency, and overall effectiveness of the procurement process. Buyers may also develop confidence that the procurement decisions made using this decision support tool result in the best overall deal and that the buyers are not being taken advantage of or otherwise missing out on significantly more favorable options. The present invention may provide buyers with substantially real-time visibility into real supplier availability constraints and into details needed to understand the issues, evaluate the alternatives, and facilitate procurement according o their needs. The present invention may further provide a user interface through which buyers may access intuitive and feature rich workflows in connection with such guided buying decision support.

Systems and methods incorporating one or more of these or other advantages are well suited for modern commercial transaction environments such as those associated with electronic marketplaces. Other technical advantages are readily apparent to those skilled in the art from the following figures, descriptions, and claims.

BRIEF DESCRIPTION OF THE DRAWINGS

To provide a more complete understanding of the present invention and features and advantages thereof, reference is made to the following description in conjunction with the accompanying drawings, in which:

FIGS. 3A through 3D illustrate exemplary displays that are associated with guided buying decision support in an electronic marketplace environment;

FIG. 4 illustrates an exemplary method of setting up a system for providing guided buying decision support in an electronic marketplace environment.

DETAILED DESCRIPTION OF THE INVENTION

Figure 1:
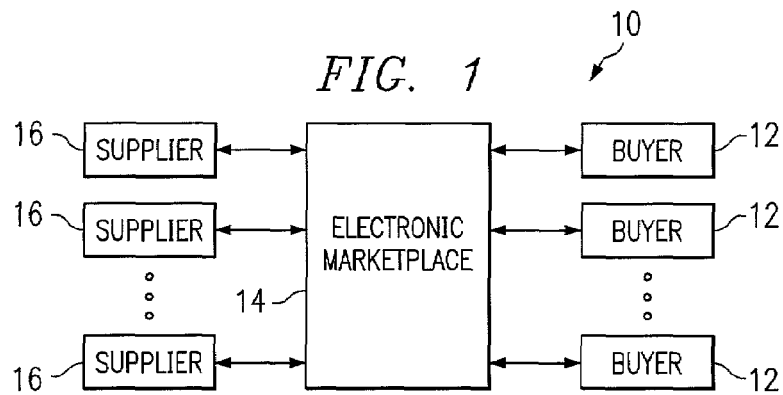
FIG. 1 illustrates an exemplary system for providing guided buying decision support in an electronic marketplace environment.

FIG. 1 illustrates an exemplary system 10 that provides one or more buyers 12 with guiding buying decision support within an electronic marketplace environment. Each buyer 12 may be coupled to a business-to-business ("B2B"), business-to-consumer ("B2C"), or other electronic marketplace 14 which links the buyer 12 to one or more suppliers 16 of products or other items. Depending on the nature of marketplace 14, these suppliers 16 may include any combination of original equipment manufacturers (OEMs), distributors, wholesalers, retailers, or any other entities that have agreed to supply items to buyers 12 under appropriate conditions through the marketplace 14. In general, marketplace 14 brokers procurement needs of buyers 12 among suppliers 16 to obtain an optimal or near optimal solution to these needs with minimal input required from buyers 12.

Buyers 12, suppliers 16, and marketplace 14 may each operate on one or more computer systems at one or more locations and may share data storage, communications, or other resources according to particular needs. The computer systems may include appropriate input devices, output devices, mass storage media, processors, memory, or other components for receiving, processing, storing, and communicating information according to operation of system 10. As used in this document, the term "computer" is intended to encompass a personal computer, workstation, network computer, wireless data port, wireless telephone, personal digital assistant, one or more microprocessors within these or other devices, or any other suitable processing device.

Buyers 12 and suppliers 16 may interact with marketplace 14 autonomously or according to input from one or more users. Buyers 12 and suppliers 16 may be coupled to the marketplace 14 using one or more local area networks (LANs), metropolitan area networks (MANs), wide area networks (WANs), a global computer network such as the Internet, or any other appropriate wireline, wireless, or other links. Buyers 12, suppliers 16, and marketplace 14 may communicate with one another according to a hub-and-spoke, peer-to-peer, or other suitable architecture. In one embodiment, the system 10 is implemented using a hub-and-spoke architecture in which the spokes are appropriately integrated with enterprise systems of buyers 12 and suppliers 16 and allow schedule-based data transfer between these enterprise systems and marketplace 14.

Figure 2:
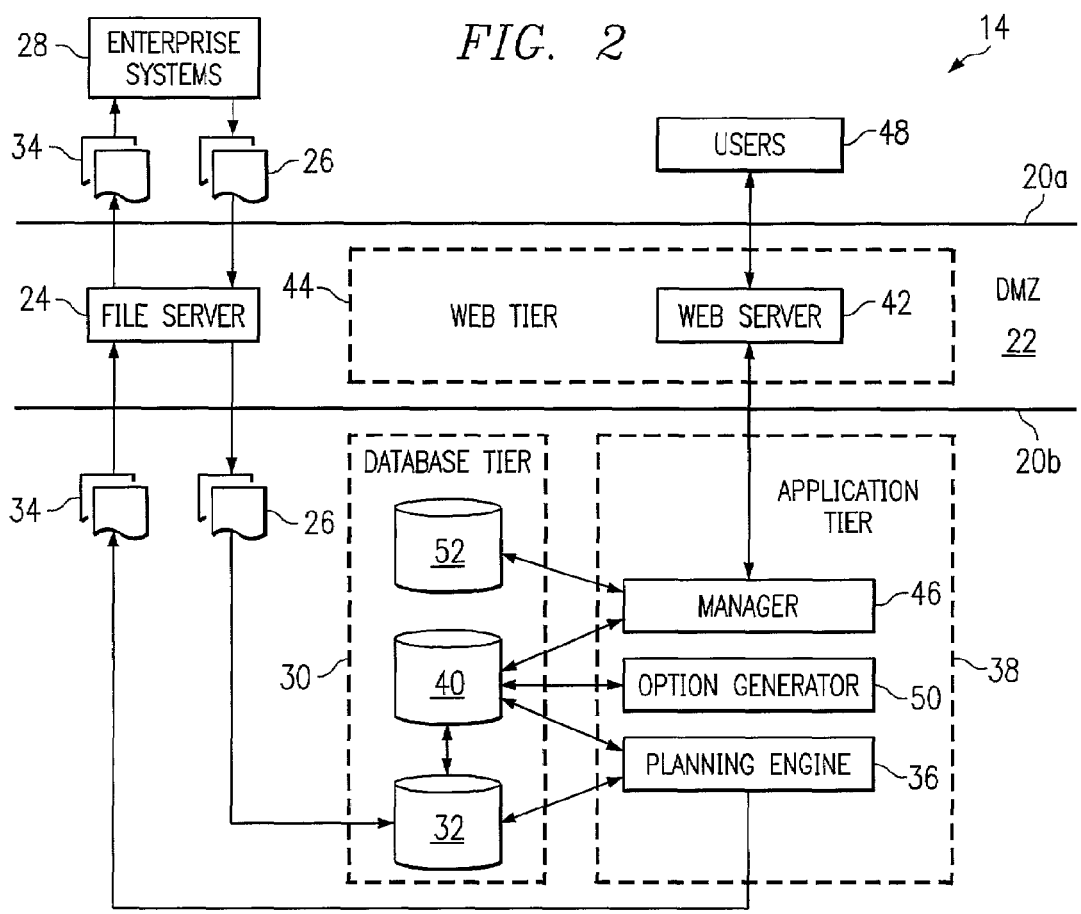
FIG. 2 illustrates an exemplary electronic marketplace.

FIG. 2 illustrates exemplary marketplace 14, and interactions with various buyers 12 and suppliers 16, in further detail. Marketplace 14 may include one or more firewalls 20 establishing a "DMZ" or other secure area 22 that separates buyers 12 and suppliers 16 from certain processing and data storage resources of marketplace 14. In one embodiment, DMZ 22 isolates a file transfer protocol (FTP) or other file server 24 that receives data files 26 from enterprise systems 28 associated with buyers 12 and suppliers 16. File server 24 communicates the data files 26 to a database tier 30 of the marketplace 14 for storage in database 32 as flatfiles or otherwise. Where marketplace 14 provides one or more hosted planning services, the file server 24 may also receive planning output 34 from one or more planning engines 36 in an application tier 38 of marketplace 14. File server 24 communicates the planning output 34 to the enterprise systems 28 associated with the buyers 12 and suppliers 16 as appropriate. In a more particular embodiment, the planning engine 36 is a supply chain planning engine that generates planning information for some or all of the value chain containing buyers 12 and suppliers 16 based on data files 26 received from enterprise systems 28. Planning engine 36 may interact with database 32 or, more preferably with respect to particular tasks, with an active data warehouse (ADW) 40 in which the information contained in data files 26 may be stored and updated.

DMZ 22 also isolates one or more web servers 42, within a web tier 44 of the marketplace 14, that communicate between a manager 46 within application tier 38 and one or more users 48 associated with the buyers 12 and suppliers 16. For example, the web server 42 may communicate with the users 48 using Hypertext Markup Language (HTML) pages or Extensible Markup Language (XML) documents contained Secure Hypertext Transfer Protocol (S-HTTP) or other suitable requests. While file-based, web-based, and other communication techniques are described, members of the marketplace environment may communicate in any appropriate manner without departing from the intended scope of the present invention. Where appropriate, reference to the actions of buyers 12 and suppliers 16 is meant to encompass the actions of associated enterprise systems 28 and/or users 48. As described above, buyers 12 and suppliers 16 may be entirely or at least substantially autonomous in certain embodiments.

In one embodiment, manager 46 is responsible for managing the flow of data to, from, and within marketplace 14 in connection with guided buying decision support on behalf of buyers 12. Manager 46 may have access to ADW 40 if appropriate. Manager 46 is associated with an option generator 50. As described more fully below, based on information received from a buyer 12 reflecting its procurement needs and constraints, and based on status data received from suppliers 16 reflecting current supply and other availability information concerning items available from suppliers 16, option generator 50 generates one or more procurement options to attempt to provide an optimal or near optimal solution to the procurement needs and constraints of buyer 12. In response to selection of a procurement option by a buyer 12 or otherwise, manager 46 may initiate one or more suitable services as described more fully below. Manager 46 may access information stored in a database 52 in connection with services it initiates on behalf of buyers 12. While database 32, ADW 40, and database 52 are described as being separate devices, the present invention contemplates these storage components being wholly or partially integral to one another, according to particular needs.

The components of marketplace 14 may be implemented using any appropriate combination of software, firmware, hardware, or other media. Software components of marketplace 14 may be implemented using any suitable software methodologies. For example, planning engine 36, manager 46, and option generator 50 may be developed using object-oriented software methodologies in certain embodiments.

In one embodiment, marketplace 14 may support custom procurement, contract procurement, and spot procurement based on guided buying decision support. Although described as being separate modes of procurement, the present invention contemplates any combination of custom, contract, and spot procurement according to the particular needs of buyer 12.

Once buyer 12 identifies a need for an item, the buyer 12 must typically make numerous decisions, possibly after significant inquiries and evaluation, before actually agreeing to purchase the item from a particular supplier 16. For example, one or more suppliers 16 might offer the item as a standard catalog item, one or more suppliers 16 might regularly manufacture the item to various buyer specifications, and one or more suppliers 16 might be able to custom manufacture the item for the first time based on buyer specifications. Buyer 12 may not know any suppliers 16 of the item, whether a supplier 16 has previously supplied the item to buyer 12, or whether a supplier 16 has ever supplied the particular item to any buyer 12. Even if the buyer 12 knows which suppliers 16 supply the item and under what circumstances, buyer 12 may not know whether contracts covering the item exist with these suppliers 16 or the terms of such contracts. Buyer 12 may only have contracts with one or more suppliers 16 out of a group of possibly hundreds of suppliers 16 willing to supply the item. These contracts may be flexible as to quantities, prices, or other important terms. If no contract exists with a supplier 16, buyer 12 might need to decide whether a contract is desirable, for example, to obtain better pricing, delivery, and other terms in exchange for purchasing specified quantities over time. If the item must be custom-made, a contract might be required as a condition of sale. The item may be the subject of one or more auctions, inventory listing service (ILS) postings, or other supplier-initiated efforts to dispose of excess inventory, as described in U.S. application Ser. No. 09/841,320, now pending. Choosing the best overall alternative will often be far from trivial. According to the present invention, the marketplace 14 provides guided buying workflows to help facilitate and automate such decision-making processes.

As described above, manager 46 may initiate one or more suitable services in response to input from buyer 12 or in response to planning information from a planning engine 36 indicating procurement needs at the buyer 12. Services available to manager 46 may be identified in database 52, which manager 46 may access for information relating to these services. In one embodiment, the manager 46 may initiate services to perform one or more of the following, in any combination and without limitation: (1) purchase some or all needed items from one or more suppliers 16 according to any new or previously existing contracts between the buyer 12 and suppliers 16; (2) purchase some or all needed items from one or more suppliers 16 according to supplier catalogs, typically at list price; (3) purchase some or all needed items from one or more suppliers 16 based on any ILS postings, typically at a discount price; (4) place a bid for some or all needed items within a bid/ask exchange; (5) place a bid for some or all needed items in an existing forward auction; or (6) initiate one or more reverse auctions for some or all needed items.

Manager 46 enables buyer 12 to select from among recommended or otherwise available purchasing options to identify one or more options that together provide the most optimal solution to the procurement needs of buyer 12, subject to applicable pricing, schedule, delivery, and other constraints of buyer 12 and suppliers 16. For example, as described below with reference to FIGS. 3A through 3D, manager 46 may oversee operation of a user interface associated with web server 42 through which a user 48 associated with buyer 12 may access resources of marketplace 14 and be guided through a procurement workflow.

After selection of one or more options, manager 46 preferably manages, in whole or in part, the one or more transactions required to actually fulfill the procurement needs. Manager 46 may perform such tasks in reliance on input from enterprise systems 28 or other internal business processes of the parties to the transaction. Manager 46 may interact with intelligent agents associated with the parties to a transaction to resolve the transaction. An exemplary spot procurement workflow is described more fully below. This workflow assumes, at least for items procured using the spot workflow, that buyer 12 cannot significantly influence the design of the items (no custom procurement) and long term commitments are either not desired or are unavailable (no contract procurement). As described above, however, the present invention contemplates any combination of custom, contract, and spot procurement according to the particular needs of buyer 12. FIGS. 3A through 3D illustrate exemplary displays that may be associated with a spot procurement workflow, depending on buyer 12, the needed items, suppliers 16, and other variables. These displays may be provided to buyer 12 using a conventional web browser or in another suitable manner.

Buyer 12 first provides a parametric description of the needed items. FIGS. 3A and 3B illustrate an exemplary display 60 into which user 48 has provided procurement parameters 62 concerning a DRAM device. Parameters 62 may specify (1) a name or high level description of the item; (2) one or more required, desired, or other features, characteristics, or other potentially distinguishing aspects of the item; (3) a required, desired, minimum, or other quantity of the item; (4) a required, desired, minimum, or other condition of the item, such as whether it should be new, refurbished, or used; (5) a required, desired, minimum, or other quality rating for the item; (6) a required, desired, last acceptable, or other delivery date for the item; (7) a required, desired, or furthest acceptable delivery location for the item; (8) a required, desired, or other supplier type for the item, such as whether the supplier 16 should be a manufacturer, distributor, or possibly another buyer 12 that at this time is seeking to dispose of its excess inventory; (9) a required, desired, minimum, or other quality rating for the supplier 16, such as is described in U.S. application Ser. No. 09/953,462 now pending; or (10) any other suitable information on which marketplace 14 may base procurement decisions and recommendations.

In one embodiment, display 60 may guide the buyer 12 through the parameter specification process. For example, in response to the buyer 12 providing a name or general description of a needed item, display 60 may present only fields and associated options relating to that general category of item. As an example, a "Color" field might not be appropriate for procurement of a DRAM device. As buyer 12 provides further parameters 62 using these fields, display 60 may limit subsequent fields and associated options as appropriate to reduce the chance the buyer 12 will specify parameters 62 for which no items exist or are otherwise inappropriate. For example, if a "Dual" terminal position DRAM device could only be made with a "J-Bend" terminal form, display 60 might not allow buyer 12 to specify a "J-Bend" terminal form parameter 62 if buyer 12 has already specified a "Dual" terminal position parameter 62. The present invention contemplates the buyer 12 specifying parameters 62 in stages, for example, specifying a first group of parameters 62 to determine a relatively broad set of procurement options and then specifying a second group of parameters 62 to either narrow the initial options or determine an alternative set of options.

In one embodiment, in response to receiving suitable procurement parameters 62 from buyer 12, the marketplace 14 uses one or more planning engines 36, manager 46, and option generator 50 to determine one or more item-supplier combinations that are consistent with parameters 62. The combinations may then be provided to buyer 12 within a display or otherwise. For example, as shown in FIG. 3C, marketplace 14 may provide the user 48 with a display 64 including one or more available options 66 determined according to parameters 62 provided using display 60 described above. If user 48 changes one or more parameters 62 within display 60, then marketplace 14 might determine different available options 66, such that user 48 is able to view in substantially real-time the impact any changed parameters 62 have on its procurement options. Within display 64, available options 66 may be displayed according to their overall desirability based on one or more parameters 62, according to any particular parameter 62 such as price, or in any other appropriate manner. While display 64 is described as being separate from display 60, one or more available options 66 may be provided within the same display 60 in which parameters 62 are entered. For example, this may make the impact of changing parameters 62 more readily apparent to user 48. The present invention contemplates available options 66 being provided to buyer 12 in any suitable manner. Buyer 12 may select an available option 66 to directly procure the needed items according to the specifics of the available option 66 that is selected.

Figure 3D:
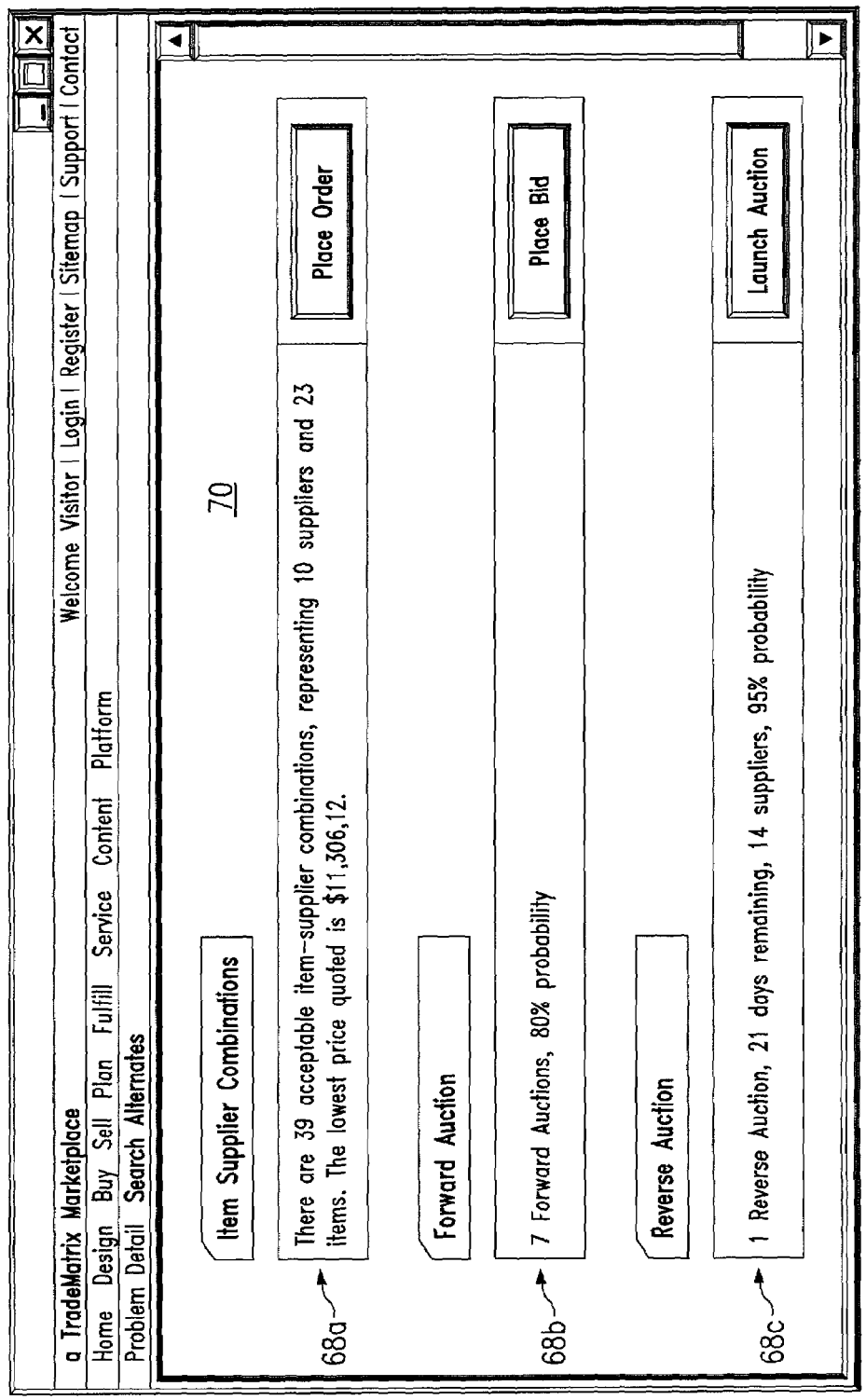

Instead of or in addition to one or more available options 66, marketplace 14 preferably provides one or more recommended options 68 in a display 70 or otherwise, as illustrated in FIG. 3D. Recommended options 68 may include a recommended purchase 68a, for example, from the supplier 16 that is offering the needed item at the lowest price consistent with all the procurement parameters 62. Where fewer than all parameters 62 are satisfied, the recommended purchase might be from the supplier 16 that satisfies the most parameters 62, satisfies the most important parameters 62, or otherwise satisfies one or more selected parameters 62 at the lowest price. Recommended purchase 68a may reflect a suitable balance between sufficiently satisfying the parameters 62 and obtaining a sufficiently low price. The recommended purchase 68a may be based on availability, pricing, and other data provided through a catalog, ILS posting, bid/ask exchange, or in any other suitable manner. Recommended purchase 68a may also be based at least in part on supplier data stored in ADW 40 or elsewhere, which may be used to determine or possibly validate availability data and other information relevant to the ability of suppliers 16 to satisfy parameters 62. The recommended purchase 68a may be made automatically, in response to input from the buyer 12, or not at all.

Recommended options 68 may include recommended auction 68b, instead of or in addition to recommended purchase 68a. In one embodiment, recommended auction 68b is one in which the item being auctioned and the circumstances of the auction are sufficient to satisfy one or more (and preferably all) parameters 62. For example, in a more particular embodiment, recommended auction 68b may be one in which the item satisfies a minimum quality rating parameter 62, supplier 16 that is auctioning the item meets a minimum supplier rating parameter 62, the auction is scheduled to complete in time for supplier 16 to meet a delivery date parameter 62, and the last bid is below the lowest price quoted against an acceptable item-supplier combination (which might be recommended purchase 68a).

The recommended auction 68b may be selected from a number of acceptable auctions (based on satisfying the parameters 62) as the acceptable auction expected to close at the lowest price, the acceptable auction having the highest probability that the buyer 12 will win the auction so as to obtain the needed item below a benchmark price (e.g., the lowest price quoted against an acceptable item-supplier combination, such as for recommended purchase 68a), or any other acceptable auction that is deemed to be most favorable. Probability of winning the auction may be determined based on the length of time the auction has already been running, the length of time the auction will remain open, the percentage of buyers 12 that could participate but have not yet placed bids, and any other appropriate information. In one embodiment, the probability that buyer 12 will win recommended auction 68b is provided using display 70 or otherwise, such that buyer 12 can readily decide whether to make recommended purchase 68a or instead to bid in recommended auction 68b.

In one embodiment, marketplace 14 may automatically determine for buyer 12 whether the probability of winning the auction justifies at least temporarily passing on recommended purchase 68a. Furthermore, marketplace 14 might automatically bid on behalf of buyer 12 or might recommend a bid to buyer 12. For example, marketplace 14 might recommend a proxy bid with increments of x (where x may have a previously specified value) and a ceiling equal to the lowest price quoted against an acceptable item-supplier combination (such as for a recommended purchase 68a). Of course, marketplace 14 may simply allow buyer 12 to bid without further input from marketplace 14.

The recommended options 68 may include recommended reverse auction 68c, instead of or in addition to a recommended purchase 68a or recommended auction 68b. In one embodiment, recommended reverse auction 68c is one in which the item to be reverse auctioned and the circumstances of the reverse auction are sufficient to satisfy one or more (and preferably all) the parameters 62. For example, in a more particular embodiment, a recommended reverse auction 68c might be one for which there are at least n suppliers 16 (where n may be previously specified) from which the item meets a minimum quality rating parameter 62, which meet a minimum supplier rating parameter 62, and which could meet a delivery date parameter 62 if the reverse auction lasted t (where t is the minimum duration of the reverse auction).

The recommended reverse auction 68b may be selected from among multiple acceptable reverse auctions (based on satisfying the parameters 62) as the acceptable reverse auction in which the initial bid price equals the lowest price quoted against an acceptable item-supplier combination, such as for recommended purchase 68a, or any other acceptable reverse auction considered to be the most favorable. The probability that buyer 12 can satisfy its needs through the reverse auction may be determined based on the length of time the reverse auction can be allowed to run, typically based on a delivery time parameter 62 and on the number of suppliers 16 that could satisfy the delivery time parameter 62 if the reverse auction was allowed to run that long. In one embodiment, the probability that buyer 12 will satisfy its needs with the recommended reverse auction 68c is provided using display 70 or otherwise, such that buyer 12 can readily decide whether to initiate recommended reverse auction 68c or instead either make recommended purchase 68a or bid in recommended auction 68b.

In one embodiment, marketplace 14 may automatically determine for buyer 12 whether the probability of an acceptable outcome to the reverse auction justifies at least temporarily passing on recommended purchase 68a and on recommended auction 68b. Furthermore, marketplace 14 may automatically initiate recommended reverse auction 68c for buyer 12 or might allow the buyer 12 or an associated user 48 to initiate the recommended reverse auction 68c. The price at which the auction must close, if at all, will preferably be less than the lowest price quoted against an acceptable item-supplier combination, such as the price for recommended purchase 68a.

Marketplace 14 may provide a recommended course of action where there are multiple recommended options 68, as in the example of FIG. 3D. The marketplace 14 may initiate a recommended course of action automatically or in response to input from buyer 12. In one embodiment, one or more recommended reverse auctions 68c are initiated first, in a suitable order of priority if more than one exists. The lowest bid may be accepted automatically or in response to input from the buyer 12, and the need for the item is then satisfied (assuming adequate fulfillment occurs). If there are no recommended reverse auctions 68c, then bids are made in one or more recommended auctions 68b, in an appropriate order of priority if more than one exists. If a bid is accepted, the need for the item is satisfied (assuming adequate fulfillment occurs). If there are no recommended auctions 68b, one or more recommended purchases 68a will be executed automatically or in response to input from buyer 12, and the need for the item is satisfied (again assuming adequate fulfillment occurs). The marketplace 14 preferably remains able to provide a new recommended course of action, based on new recommended purchases 68*a*, recommended auctions 68*b*, and recommended reverse auctions 68*c*, if for some reason the need for the item has not been satisfied. As just an example, if the buyer 12 places a bid in recommended auction 68*b* and does not win, then marketplace 14 may provide new recommended options 68 based on updated supplier information such that the need for the item can still be satisfied consistent with parameters 62. As another example, if a sealed bid recommended reverse auction 68*c* is initiated and no bid wins, then marketplace 14 may provide new recommended options 68 using the lowest non-winning bid as a benchmark in addition to the lowest catalog price.

For purposes of illustration only, several examples are provided below. Those skilled in the art will appreciate that the present invention encompasses all appropriate scenarios suggested in light of this description taken as a whole. In these examples, the marketplace 14 supports spot procurement based on purchases from supplier catalogs, auctions, and reverse auctions. These examples may omit some preferable features for the sake of simplicity. For example, while not incorporated into these example, before making a catalog purchase, placing a bid in an auction, or initiating a reverse auction, marketplace 14 might determine whether buyer 12 has contracts with suppliers 16 with respect to the needed item, might consult one or more ILS postings, and might perform any other suitable procurement-related activities.

In a first example, buyer 12 does not have time to initiate a reverse auction, no auctions are running, and a recommended purchase 68*a* from a supplier catalog exists consistent with the parameters 62 (including at least availability of the item before the expected completion time of any reverse auction). In this case, the needed item will be purchased from the supplier catalog according to recommended purchase 68*a*, either automatically or in response to input from buyer 12.

While the example is described as if there is no recommended reverse auction 68*c*, it might be the case that although a recommended reverse auction 68*c* exists, the probability of success has been deemed too low to justify initiating that recommended reverse auction 68*c* in view of the recommended purchase 68*a*. The present invention contemplates there being a threshold probability, specified by the buyer 12 or otherwise, for use by marketplace 14 or buyer 12 in making such determinations. Furthermore, a threshold probability may be variable, for example, depending on whether the needed item is a commodity (such that a relatively high probability is required to bypass the recommended purchase 68*a*) or is essentially non-fungible (such that even a relatively small probability might justify bypassing the recommended purchase 68*a* in favor of a recommended reverse auction 68*c*). One or more threshold probabilities may be applied in connection with any of the examples described herein.

In a second example, buyer 12 does not have time to initiate a reverse auction, one or more recommended auctions 68*b* exist (i.e. will conclude in time for buyer 12 to obtain the item consistent with parameters 62), a recommended purchase 68*a* from a supplier catalog exists consistent with parameters 62, and the last bids in one or more recommended auctions 68*b* are less than the prices from supplier catalogs reflected in recommended purchase 68*a*. In this case, a proxy bid (not to exceed a lowest catalog price) may be placed in the recommended auction 68*b* with the highest probability of winning at the lowest price, determined using any suitable technique. If recommended auction 68*b* auction completes and the bid is unsuccessful, the item may be purchased from the supplier catalog according to the recommended purchase 68*a* or, if any other recommended auctions 68*b* are still running, a proxy bid may be placed in one of these recommended auctions 68*b*.

In a third example, the buyer 12 has time to initiate a reverse auction and the recommended reverse auction 68*c* one is initiated accordingly. In this case, buyer 12 attempts to secure the lowest bid possible. If the lowest bid is greater than the lowest catalog price reflected in the recommended purchase 68*a*, the bid is rejected and the workflow continues as in the first or second examples described above. That is, either the recommended purchase 68*a* is made from a supplier catalog or a proxy bid is placed in a recommended auction 68*b* (not to exceed the lowest catalog price), respectively. Where the lowest bid is less than the lowest catalog price reflected in recommended purchase 68*a*, however, then a recommended auction 68*b* might still be considered to potentially obtain a better price. This case is similar to the second example described above, except that the lowest bid from recommended reverse auction 68*c* replaces the lowest catalog price as the ceiling for proxy bids.

FIG. 4 illustrates an exemplary method of setting up marketplace 14 to provide guided buying decision support as described above. Although described primarily in connection with set-up information for a supplier 16, the present invention contemplates the method operating analogously for each buyer 12 and supplier 16 coupled to marketplace 14. The method begins at step 100, where supplier 16 specifies its set-up information. Set-up information for supplier 16 may include, in any suitable combination and without limitation: items generally available from supplier 16; information relating to any contracts that might exist between supplier 16 and buyers 12; any other suitable sourcing data; communications information to allow the enterprise systems 28 of the supplier 16 to communicate data files 26 and planning output 34 with marketplace 14; one or more capacity trees; one or more bills of materials (BOMs); credit-related information; payment-related information; and any other suitable set-up information.

At step 102, the set-up information for supplier 16 is placed in a specified data storage location associated with supplier 16, such as behind a firewall that secures this information against unauthorized access. In a particular embodiment, at step 104, the spoke associated with supplier 16 picks up the set-up information and communicates it over the Internet or otherwise to marketplace 14 for storage in database 32 and preferably ADW 40. A user 48 may assist in communicating set-up information to marketplace 14, particularly the first time set-up information is communicated for the particular supplier 16. Thereafter, updated set-up information may be automatically communicated by the spoke from the supplier 16 to marketplace 14 on a scheduled basis.

At step 106, ADW 40 may validate one or more suitable aspects of the set-up information. If errors exist at step 108, an error log is generated and communicated to supplier 16 at step 110. In one embodiment, the error log is placed in a specified data storage location associated with supplier 16, such as behind a firewall that secures this information against unauthorized access. At step 112, supplier 16 accesses the error log, makes appropriate corrections, and regenerates some or all of the set-up information for the supplier 16. The method then returns to step 102. If no errors exist at step 108, then set-up is complete for supplier 16 at step 114.

If updates to the set-up information are warranted at step 116, supplier 16 specifies the updates at step 118 and the method then returns to step 102. The present invention contemplates updating set-up information for a supplier 16 periodically, according to an appropriate schedule, as long as supplier 16 is associated with the marketplace 14. If the supplier 16 disassociates from the marketplace 14 such that no updates occur at step 116, the method ends.

Figure 5:
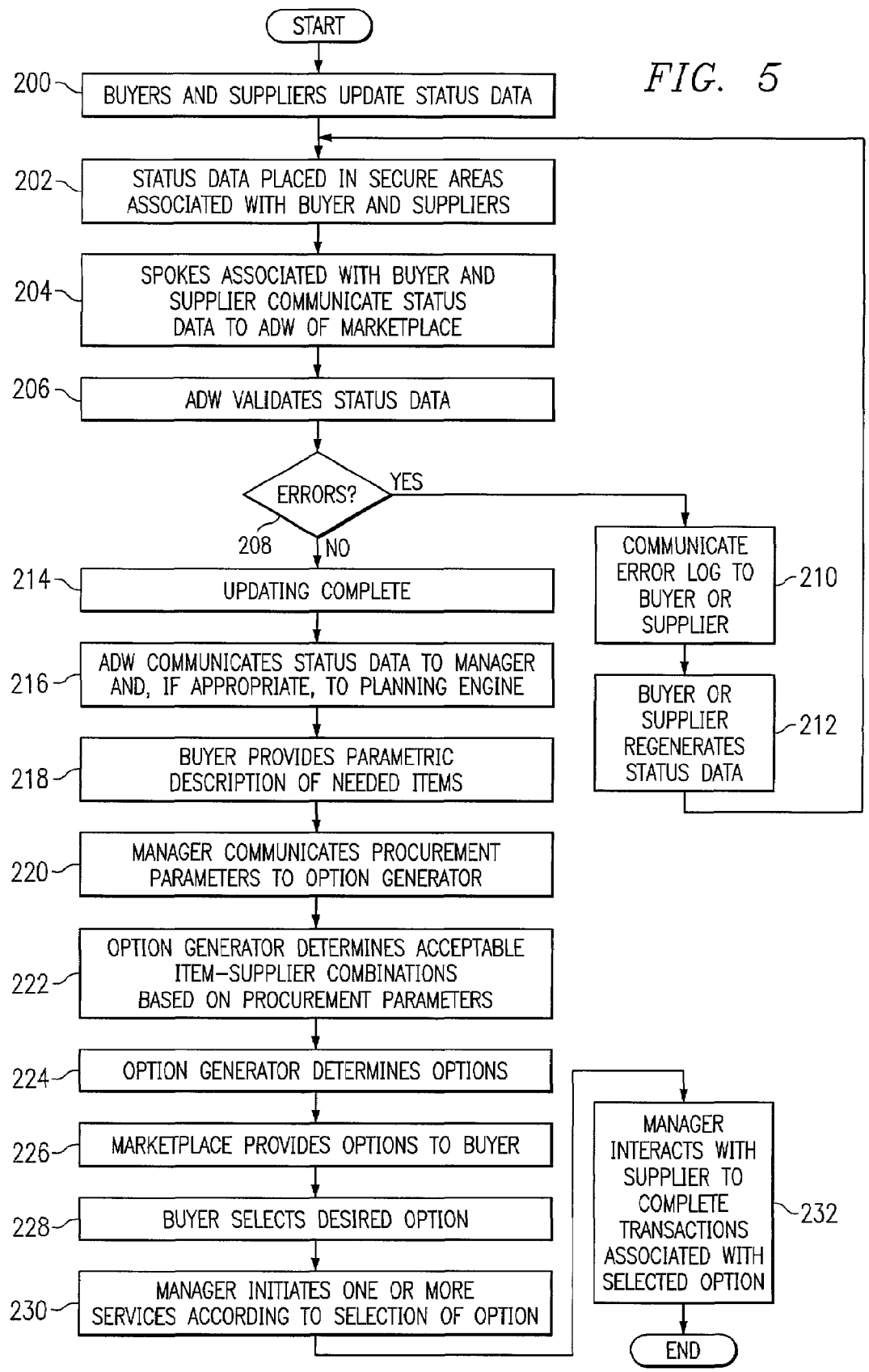
FIG. 5 illustrates an exemplary method of providing guided buying decision support in an electronic marketplace environment.

FIG. 5 illustrates an exemplary method of providing guided buying decision support to one or more buyers 12 using the resources of marketplace 14. Although multiple buyers 12 may use the guided buying decision-support capacities available through marketplace 14, the method is described for simplicity in the context of a particular buyer 12 and one or more appropriate suppliers 16. The method begins at step 200, where buyer 12 and suppliers 16 update their status data using associated enterprise systems 28. These updates may occur on a scheduled basis, serially, substantially simultaneously, or in any other appropriate manner. In one embodiment, all appropriate participants (including suppliers 16) update associated status data according to a predetermined schedule designed to help ensure that the marketplace 14 is not operating on stale data while not imposing an unduly large burden on enterprise systems 28, users 48, or any other aspects of buyers 12 and suppliers 16.

At step 202, the status data for each buyer 12 and supplier 16 is placed in a specified data storage location associated with buyer 12 or supplier 16, respectively, such as behind a firewall that protects the information against unauthorized access. In one embodiment, at step 204, the spokes associated with the buyer 12 and these suppliers 16 pick up the status data and communicate it over the Internet or otherwise to ADW 40 of marketplace 14. Although scheduled automatic communication of the status data is preferable, user 48 may assist in communicating the status data to marketplace 14 as appropriate. At step 206, ADW 40 may validate one or more appropriate aspects of the status data. If errors exist for the buyer 12 or a supplier 16 at step 208, an error log is generated and communicated to buyer 12 or supplier 16, respectively, at step 210. In one embodiment, the error log is placed in a specified data storage location associated with buyer 12 or supplier 16, such as behind a firewall that secures the information from unauthorized access. At step 212, buyer 12 or supplier 16 accesses the error log, makes suitable corrections, and regenerates some or all set-up information for the buyer 12 or supplier 16, respectively. The method then returns to step 102. If no errors exist at step 208, then updating of the status data is complete for buyer 12 and suppliers 16 at step 214. At step 216, ADW 40 communicates the status data for one or more suppliers 16 to manager 46 and, where marketplace 14 provides hosted planning services or where otherwise appropriate, to planning engine 36.

At step 218, buyer 12 provides a parametric description of one or more needed items and, at step 220, manager 46 communicates these procurement parameters 62 to option generator 50. At step 222, marketplace 14 determines one or more acceptable item-supplier combinations and, at step 224, determines one or more resulting recommended options 68. Marketplace 14 provides recommended options 68 to buyer 12 as part of display 64 or otherwise at step 226. Although the method is described in connection with generating and providing recommended options 68, as described above marketplace 14 may provide available options 66 instead of or in addition to providing recommended options 68 and may further provide a recommended course of action if multiple recommended options 68 exist. The present invention contemplates providing guided buying decision-support with respect to multiple items serially, substantially simultaneously, or in any other suitable manner. For example, if buyer 12 provides procurement parameters 62 for multiple items using a succession of displays 60, marketplace 14 may return recommended options 68 for each item within a separate display 64 or may return recommended options 68 for all items within a single display 64.

In one embodiment, buyer 12 selects a recommended option 68 at step 228. At step 230, manager 46 initiates one or more suitable services to obtain the needed items from one or more particular suppliers according to the selected option 68. As described more fully above, depending on the nature of the selected option 68, manager 46 may rely on supplier catalogs, ILS postings, bid/ask exchanges, forward auctions, reverse auctions, or any other suitable service according to particular needs. At step 232, manager 46 interacts with buyer 12, the particular suppliers 16, or both as appropriate to complete transactions associated with the selected option 68. Once the procurement of the needed items has been adequately handled, the method ends.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system providing guided buying decision support within an electronic marketplace environment, comprising:
    a server operable to interact with buyers to receive procurement parameters for items;
    an option generator operable to:
        receive procurement parameters for a particular item needed by a particular buyer;
        determine one or more acceptable item-supplier combinations consistent with the procurement parameters for the item; and
        generate a plurality of diverse types of recommended options for communication to the buyer to enable the buyer to select one of the plurality of diverse types of recommended options, each of the plurality of diverse types of recommended options communicated to the buyer for selection specifying a service through which it is possible to procure the item consistent with procurement parameters, the plurality of diverse types of recommended options communicated to the buyer for selection comprising:
            a recommended purchase from the supplier currently offering the item at the lowest price consistent with the procurement parameters;
            a recommended auction in which the item is currently being auctioned under circumstances consistent with the procurement parameters; and
            a recommended reverse auction that may be initiated with respect to the item under circumstances consistent with the procurement parameters;
    the server further operable to:
        communicate to the buyer a recommended course of action specifying the recommended option that should be selected from among the plurality of diverse types of recommended options communicated to the buyer for selection to give the buyer the best opportunity to procure the item consistent with the procurement parameters and at the lowest price; and interact with the buyer to receive a selection of a particular recommended option from among the plurality of diverse types of recommended options communicated to the buyer for selection; and a manager application operable to automatically initiate the service specified in the selected one of the plurality of diverse types of recommended options in an attempt to procure the item consistent with the procurement parameters.

2. The system of claim 1, wherein the procurement parameters comprise:

one or more parameters each specifying a characteristic of the item;

one or more parameters each specifying a date by which the item must be procured; and one or more parameters each specifying a characteristic of an acceptable supplier of the item.

3. The system of claim 1, wherein the server is operable to communicate to the buyer a first display through which the buyer may input the procurement parameters and a second display through which the buyer may select a recommended option from among the plurality of diverse types of recommended options communicated to the buyer for selection.

4. The system of claim 1, wherein the server is operable to communicate to the buyer a single display through which the buyer may select a recommended option from among the plurality of diverse types of recommended options communicated to the buyer for selection or input one or more alternative procurement parameters, the display allowing the buyer to see in substantially real time the impact of the alternative procurement parameters on the plurality of diverse types of recommended options.

5. The system of claim 1, wherein the recommended purchase in the plurality of diverse types of recommended options is based on data obtained from a catalog, an inventory listing, or a bid/ask exchange through which the supplier is offering the item.

6. The system of claim 1, wherein the circumstances of the recommended auction in the plurality of diverse types of recommended options are selected from the group consisting of:

the date the auction is scheduled to complete is consistent with a delivery date procurement parameter and the last bid is below the lowest price quoted against an acceptable item-supplier combination;

the auction is the currently running auction expected to close at the lowest price; and the auction is the currently running auction with the highest probability that the buyer will win the auction with a bid below the lowest price quoted against an acceptable item-supplier combination.

7. The system of claim 6, wherein the probability of winning an auction is determined according to the length of time the auction has already been running, the length of time the auction will continue running, and the percentage of buyers that could participate in the auction but have not yet placed bids.

8. The system of claim 1, wherein the probability of the buyer winning the recommended auction in the plurality of diverse types of recommended options is provided to the buyer to allow the buyer to decide whether to select the recommended auction instead of the recommended purchase.

9. The system of claim 1, wherein the manager is operable to recommend a bid for placement in the recommended auction in the plurality of diverse types of recommended options.

10. The system of claim 9, wherein the recommended bid is a proxy bid with specified increments and a ceiling equal to the lowest price quoted against an acceptable item-supplier combination.

11. The system of claim 1, wherein the circumstances of the recommended reverse auction in the plurality of diverse types of recommended options are selected from the group consisting of:

there are at least a specified number of suppliers that could satisfy a delivery date procurement parameter if the reverse auction lasted for a specified length of time; and the reverse auction has the highest probability of all evaluated reverse auctions that the buyer will procure the item below the lowest price quoted against an acceptable item-supplier combination.

12. The system of claim 11, wherein the probability the buyer will procure the item below the lowest price quoted against an acceptable item-supplier combination is determined according to:

the length of time the reverse auction can be allowed to run consistent with a delivery date procurement parameter; and the number of suppliers that could satisfy the delivery date procurement parameter if the reverse auction was allowed to run for that length of time.

13. The system of claim 11, wherein the probability the buyer will procure the item below the lowest price quoted against an acceptable item-supplier combination is provided to the buyer to allow the buyer to decide whether to select the recommended reverse auction instead of the recommended purchase or the recommended auction.

14. The system of claim 1, further comprising a planning engine operable to receive status data for the buyer from one or more associated enterprise systems, the status data specifying one or more of the procurement parameters.

15. The system of claim 1, further comprising an electronic marketplace that supports the server, the option generator, and the manager application.

16. A method of providing guided buying decision support within an electronic marketplace environment, comprising:

receiving procurement parameters for a particular item needed by a particular buyer;

determining one or more acceptable item-supplier combinations consistent with the procurement parameters for the item;

generating a plurality of diverse types of recommended options for communication to the buyer to enable the buyer to select one of the plurality of diverse types of recommended options, each of the plurality of diverse types of recommended options communicated to the buyer for selection specifying a service through which it is possible to procure the item consistent with the procurement parameters, the plurality of diverse types of recommended options communicated to the buyer for selection comprising:

a recommended purchase from the supplier currently offering the item at the lowest price consistent with the procurement parameters;

a recommended auction in which the item is currently being auctioned under circumstances consistent with the procurement parameters; and a recommended reverse auction that may be initiated with respect to the item under circumstances consistent with the procurement parameters;

communicating to the buyer a recommended course of action specifying the recommended option that should be selected from among the plurality of diverse types of recommended options communicated to the buyer for selection to give the buyer the best opportunity to procure the item consistent with the procurement parameters and at the lowest price;

receiving a selection of a particular recommended option from among the plurality of diverse types of recommended options communicated to the buyer for selection; and automatically initiating the service specified in the selected one of the plurality of diverse types of recommended options in an attempt to procure the needed item consistent with the procurement parameters.

17. The method of claim 16, wherein the procurement parameters comprise:

one or more parameters each specifying a characteristic of the item;

one or more parameters each specifying a date by which the item must be procured; and one or more parameters each specifying a characteristic of an acceptable supplier of the item.

18. The method of claim 16, further comprising communicating to the buyer a first display through which the buyer may input the procurement parameters and a second display through which the buyer may select a recommended option from among the plurality of diverse types of recommended options communicated to the buyer for selection.

19. The method of claim 16, further comprising communicating to the buyer a single display through which the buyer may select a recommended option from among the plurality of diverse types of recommended options communicated to the buyer for selection or input one or more alternative procurement parameters, the display allowing the buyer to see in substantially real time the impact of the alternative procurement parameters on the plurality of diverse types of recommended options.

20. The method of claim 16, wherein the recommended purchase in the plurality of diverse types of recommended options is based on data obtained from a catalog, an inventory listing, or a bid/ask exchange through which the supplier is offering the item.

21. The method of claim 16, wherein the circumstances of the recommended auction in the plurality of diverse types of recommended options are selected from the group consisting of:

the date the auction is scheduled to complete is consistent with a delivery date procurement parameter and the last bid is below the lowest price quoted against an acceptable item-supplier combination;

the auction is the currently running auction expected to close at the lowest price; and the auction is the currently running auction with the highest probability that the buyer will win the auction with a bid below the lowest price quoted against an acceptable item-supplier combination.

22. The method of claim 21, wherein the probability of winning an auction is determined according to the length of time the auction has already been running, the length of time the auction will continue running, and the percentage of buyers that could participate in the auction but have not yet placed bids.

23. The method of claim 16, further comprising providing to the buyer the probability of the buyer winning the recommended auction in the plurality of diverse types of recommended options to allow the buyer to decide whether to select the recommended auction instead of the recommended purchase.

24. The method of claim 16, further comprising recommending a bid for placement in the recommended auction in the plurality of diverse types of recommended options.

25. The method of claim 24, wherein the recommended bid is a proxy bid with specified increments and a ceiling equal to the lowest price quoted against an acceptable item-supplier combination.

26. The method of claim 16, wherein the circumstances of the recommended reverse auction in the plurality of diverse types of recommended options are selected from the group consisting of:

that there are at least a specified number of suppliers that could satisfy a delivery date procurement parameter if the reverse auction lasted for a specified length of time; and the reverse auction has the highest probability of all evaluated reverse auctions that the buyer will procure the item below the lowest price quoted against an acceptable item-supplier combination.

27. The method of claim 26, wherein the probability the buyer will procure the item below the lowest price quoted against an acceptable item-supplier combination is determined according to:

the length of time the reverse auction can be allowed to run consistent with a delivery date procurement parameter; and the number of suppliers that could satisfy the delivery date procurement parameter if the reverse auction was allowed to run for that length of time.

28. The method of claim 26, further comprising providing to the buyer the probability the buyer will procure the item below the lowest price quoted against an acceptable item-supplier combination to allow the buyer to decide whether to select the recommended reverse auction instead of the recommended purchase or the recommended auction.

29. The method of claim 16, further comprising receiving status data for the buyer from one or more associated enterprise systems, the status data specifying one or more of the procurement parameters.

30. The method of claim 16, wherein the method is performed using components of an electronic marketplace.

31. Software for providing guided buying decision support within an electronic marketplace environment, the software embodied in a computer-readable medium and when executed operable to:

receive procurement parameters for a particular item needed by a particular buyer;

determine one or more acceptable item-supplier combinations consistent with the procurement parameters for the item;

generate a plurality of diverse types of recommended options for communication to the buyer to enable the buyer to select one of the plurality of diverse types of recommended options, each of the plurality of diverse types of recommended options communicated to the buyer for selection specifying a service through which it is possible to procure the item consistent with the procurement parameters, the plurality of diverse types of recommended option options communicated to the buyer for selection comprising:
- a recommended purchase from the supplier currently offering the item at the lowest price consistent with the procurement parameters;
- a recommended auction in which the item is currently being auctioned under circumstances consistent with the procurement parameters; and
- a recommended reverse auction that may be initiated with respect to the item under circumstances consistent with the procurement parameters;

communicate to the buyer a recommended course of action specifying the recommended option that should be selected from among the plurality of diverse types of recommended options communicated to the buyer for selection to give the buyer the best opportunity to procure the item consistent with the procurement parameters and at the lowest price;

receive a selection of a particular recommended option from among the plurality of diverse types of recommended options communicated to the buyer for selection; and automatically initiate the service specified in the selected one of the plurality of diverse types of recommended options in an attempt to procure the item consistent with the procurement parameters.

32. The software of claim 31, wherein the procurement parameters comprise:
- one or more parameters each specifying a characteristic of the item;
- one or more parameters each specifying a date by which the item must be procured; and
- one or more parameters each specifying a characteristic of an acceptable supplier of the item.

33. The software of claim 31, further operable to communicate to the buyer a first display through which the buyer may input the procurement parameters and a second display through which the buyer may select a recommended option from among the plurality of diverse types of recommended options communicated to the buyer for selection.

34. The software of claim 31, further operable to communicate to the buyer a single display through which the buyer may select a recommended option from among the plurality of diverse types of recommended options communicated to the buyer for selection or input one or more alternative procurement parameters, the display allowing the buyer to see in substantially real time the impact of the alternative procurement parameters on the plurality of diverse types of recommended options.

35. The software of claim 31, wherein the recommended purchase in the plurality of diverse types of recommended options is based on data obtained from a catalog, an inventory listing, or a bid/ask exchange through which the supplier is offering the item.

36. The software of claim 31, wherein the circumstances of the recommended auction in the plurality of diverse types of recommended options are selected from the group consisting of:
- the date the auction is scheduled to complete is consistent with a delivery date procurement parameter and the last bid is below the lowest price quoted against an acceptable item-supplier combination;
- the auction is the currently running auction expected to close at the lowest price; and
- the auction is the currently running auction with the highest probability that the buyer will win the auction with a bid below the lowest price quoted against an acceptable item-supplier combination.

37. The software of claim 36, wherein the probability of winning an auction is determined according to the length of time the auction has already been running, the length of time the auction will continue running, and the percentage of buyers that could participate in the auction but have not yet placed bids.

38. The software of claim 31, further operable to provide to the buyer the probability of the buyer winning the recommended auction in the plurality of diverse types of recommended options to allow the buyer to decide whether to select the recommended auction instead of the recommended purchase.

39. The software of claim 31, further operable to recommend a bid for placement in the recommended auction in the plurality of diverse types of recommended options.

40. The software of claim 39, wherein the recommended bid is a proxy bid with specified increments and a ceiling equal to the lowest price quoted against an acceptable item-supplier combination.

41. The software of claim 31, wherein the circumstances of the recommended reverse auction in the plurality of diverse types of recommended options are selected from the group consisting of:
- that there are at least a specified number of suppliers that could satisfy a delivery date procurement parameter if the reverse auction lasted for a specified length of time; and
- the reverse auction has the highest probability of all evaluated reverse auctions that the buyer will procure the item below the lowest price quoted against an acceptable item-supplier combination.

42. The software of claim 41, wherein the probability the buyer will procure the item below the lowest price quoted against an acceptable item-supplier combination is determined according to:
- the length of time the reverse auction can be allowed to run consistent with a delivery date procurement parameter; and
- the number of suppliers that could satisfy the delivery date procurement parameter if the reverse auction was allowed to run for that length of time.

43. The software of claim 41, further operable to provide to the buyer the probability the buyer will procure the item below the lowest price quoted against an acceptable item-supplier combination to allow the buyer to decide whether to select the recommended reverse auction instead of the recommended purchase or the recommended auction.

44. The software of claim 31, further operable to receive status data for the buyer from one or more associated enterprise systems, the status data specifying one or more of the procurement parameters.

45. The software of claim 31, wherein the software is executed using components of an electronic marketplace.

46. A system providing guided buying decision support within an electronic marketplace environment, comprising:
- means for receiving procurement parameters for a particular item needed by a particular buyer, determining one or more acceptable item-supplier combinations consistent with the procurement parameters for the item;
- means for generating a plurality of diverse types of recommended options for communication to the buyer to enable the buyer to select one of the plurality of diverse types of recommended options, each of the plurality of diverse types of recommended options communicated to the buyer for selection specifying a service through which it is possible to procure the item consistent with the procurement parameters, the plurality of diverse types of recommended options communicated to the buyer for selection comprising:
a recommended purchase from the supplier currently offering the item at the lowest price consistent with the procurement parameters;
a recommended auction in which the item is currently being auctioned under circumstances consistent with the procurement parameters; and
a recommended reverse auction that may be initiated with respect to the item under circumstances consistent with the procurement parameters;
means for communicating to the buyer a recommended course of action specifying the recommended option that should be selected from among the plurality of diverse types of recommended options communicated to the buyer for selection to give the buyer the best opportunity to procure the item consistent with the procurement parameters and at the lowest price; and
means for interacting with the buyer to receive a selection of a particular recommended option from among the plurality of diverse types of recommended options communicated to the buyer for selection; and
means for automatically initiating the service specified in the selected one of the plurality of diverse types of recommended options in an attempt to procure the item consistent with the procurement parameters.

47. A system providing guided buying decision support within an electronic marketplace environment, comprising:
a server operable to interact with buyers to receive procurement parameters for items;
an option generator operable to:
receive procurement parameters for a particular item needed by a particular buyer;
determine one or more acceptable item-supplier combinations consistent with the procurement parameters for the item; and
generate a plurality of diverse types of recommended options for communication to the buyer to enable the buyer to select one of the plurality of diverse types of recommended options, each of the plurality of diverse types of recommended options communicated to the buyer for selection specifying a service through which it is possible to procure the item consistent with the procurement parameters, the plurality of diverse types of recommended options communicated to the buyer for selection comprising:
a recommended purchase from the supplier offering the item at the lowest price consistent with the procurement parameters;
a recommended auction in which the item is being auctioned under circumstances consistent with the procurement parameters; and
a recommended reverse auction that may be initiated with respect to the item under circumstances consistent with the procurement parameters;
the server further operable to:
provide to the buyer the probabilities the buyer will procure the item in the recommended auction and in the recommended reverse auction below the lowest price quoted against an acceptable item-supplier combination to allow the buyer to decide whether to select the recommended auction or recommended reverse auction, respectively, instead of the recommended purchase; and
interact with the buyer to receive a selection of a particular recommended option from among the plurality of diverse types of recommended options communicated to the buyer for selection; and
a manager application operable to automatically initiate the service specified in the selected one of the plurality of diverse types of recommended options in an attempt to procure the item consistent with the procurement parameters.

48. A method of providing guided buying decision support within an electronic marketplace environment, comprising:
receiving procurement parameters for a particular item needed by a particular buyer;
determining one or more acceptable item-supplier combinations consistent with the procurement parameters for the item;
generating a plurality of diverse types of recommended options for communication to the buyer to enable the buyer to select one of the plurality of diverse types of recommended options, each of the plurality of diverse types of recommended options communicated to the buyer for selection specifying a service through which it is possible to procure the item consistent with the procurement parameters, the plurality of diverse types of recommended options communicated to the buyer for selection comprising:
a recommended purchase from the supplier offering the item at the lowest price consistent with the procurement parameters;
a recommended auction in which the item is being auctioned under circumstances consistent with the procurement parameters; and
a recommended reverse auction that may be initiated with respect to the item under circumstances consistent with the procurement parameters;
providing to the buyer the probabilities the buyer will procure the item in the recommended auction and in the recommended reverse auction below the lowest price quoted against an acceptable item-supplier combination to allow the buyer to decide whether to select the recommended auction or recommended reverse auction, respectively, instead of the recommended purchase; and
receiving a selection of a particular recommended option from among the plurality of diverse types of recommended options communicated to the buyer for selection; and
automatically initiating the service specified in the selected one of the plurality of diverse types of recommended options in an attempt to procure the item consistent with the procurement parameters.

49. Software for providing guided buying decision support within an electronic marketplace environment, the software being embodied in a computer-readable medium and when executed operable to:
receive procurement parameters for a particular item needed by a particular buyer;
determine one or more acceptable item-supplier combinations consistent with the procurement parameters for the item;
generate a plurality of diverse types of recommended options for communication to the buyer to enable the buyer to select one of the plurality of diverse types of recommended options, each of the plurality of diverse types of recommended options communicated to the buyer for selection specifying a service through which it is possible to procure the item consistent with the procurement parameters, the plurality of diverse types of recommended options communicated to the buyer for selection comprising:
- a recommended purchase from the supplier offering the item at the lowest price consistent with the procurement parameters;
- a recommended auction in which the item is being auctioned under circumstances consistent with the procurement parameters; and
- a recommended reverse auction that may be initiated with respect to the item under circumstances consistent with the procurement parameters;

provide to the buyer the probabilities the buyer will procure the item in the recommended auction and in the recommended reverse auction below the lowest price quoted against an acceptable item-supplier combination to allow the buyer to decide whether to select the recommended auction or recommended reverse auction, respectively, instead of the recommended purchase;

receive a selection of a particular recommended option from among the plurality of diverse types of recommended options communicated to the buyer for selection; and automatically initiate the service specified in the selected one of the plurality of diverse types of recommended options in an attempt to procure the item consistent with the procurement parameters.

* * * * *